United States Patent

[11] 3,610,956

[72] Inventors Raymond Louis Giordano
Berlin;
Donald John Poitras, Haddonfield, both of N.J.
[21] Appl. No. 873,018
[22] Filed Oct. 31, 1969
[45] Patented Oct. 5, 1971
[73] Assignee RCA Corporation

[54] DRIFT-COMPENSATED AVERAGE VALUE CROSSOVER DETECTOR
7 Claims, 2 Drawing Figs.

[52] U.S. Cl. .......... 307/235, 328/116, 328/147, 328/149, 330/69
[51] Int. Cl. .......... H03K 5/20
[50] Field of Search .......... 307/235; 328/146, 147, 149, 115, 116, 135; 330/69, 30 D

[56] References Cited
UNITED STATES PATENTS

| | | | |
|---|---|---|---|
| 2,985,836 | 5/1961 | Hatton | 307/235 |
| 3,073,972 | 1/1963 | Jenkins | 307/288 |
| 3,299,271 | 1/1967 | Stites | 307/235 |
| 3,509,373 | 4/1970 | Cutler | 307/237 |

OTHER REFERENCES

IBM Tech. Dis., Wilford, Oct. 1968, Vol. 11, No. 5, p. 499, 307—235
IBM Tech. Dis., Cackowski, Oct. 1964, Vol. 7, No. 5

*Primary Examiner*—Donald Forrer
*Assistant Examiner*—David M. Carter
*Attorney*—H. Christoffersen

ABSTRACT: A signal source having positive and negative excursions about an average voltage which may itself vary in amplitude, is coupled directly to one input of a differential amplifier and via a low-pass filter to the second input of the differential amplifier. The amplifier conducts equal currents, when both inputs are at the average voltage of the signal source. When the source voltage "crosses over" from a value on one side of this average to a value on the other side of the average, the amplifier becomes unbalanced. The change from balanced to unbalanced condition may be employed to produce a pulse indicative of this crossover.

INVENTORS
RAYMOND LOUIS GIORDANO
& DONALD JOHN POITRAS
BY H. Christoffersen
Attorney

DRIFT-COMPENSATED AVERAGE VALUE CROSSOVER DETECTOR

BACKGROUND OF THE INVENTION

In the computer field there are many applications requiring a circuit for detecting the passage of an alternating voltage through its average or reference value. In the prior art such zero crossover circuits, as they are often called, either directly coupled or capacitively coupled to the signal source, have not been entirely satisfactory. They sometimes cause an indication of signal passage through its average value, before or after this event has actually occurred.

For example, the capacitor in a capacitively coupled circuit tends to charge up in response to closely spaced input pulses. This causes the zero crossover circuit to produce an output in advance of the passage of the input signal through its average or zero value.

In attempting to overcome this problem, directly coupled circuits such as that described in U.S. Pat. No. 3,348,068, Miller, have been devised. Such circuits are referenced to some fixed reference voltage level such as, for example, ground. If the average voltage level of the signal source varies relative to the reference voltage level of the crossover detection circuit, erroneous operation results. The time of passage of the signal through the reference level of the crossover circuit rather than its time of passage through the reference level of signal source is detected.

An object of the present invention is to provide a direct-coupled, average value crossover detector circuit insensitive to variations in the reference level of the signal source.

SUMMARY OF THE INVENTION

A source of signals having positive and negative excursions about some average level is coupled directly and through a filter respectively, to the two input terminals of a differential amplifier. The filter serves to maintain its differential amplifier input terminal at a voltage level which is the average value of the signal source voltage level. Passage of the voltage level through its average value causes the differential amplifier to produce an output signal.

DETAILED DESCRIPTION

Figure 1:
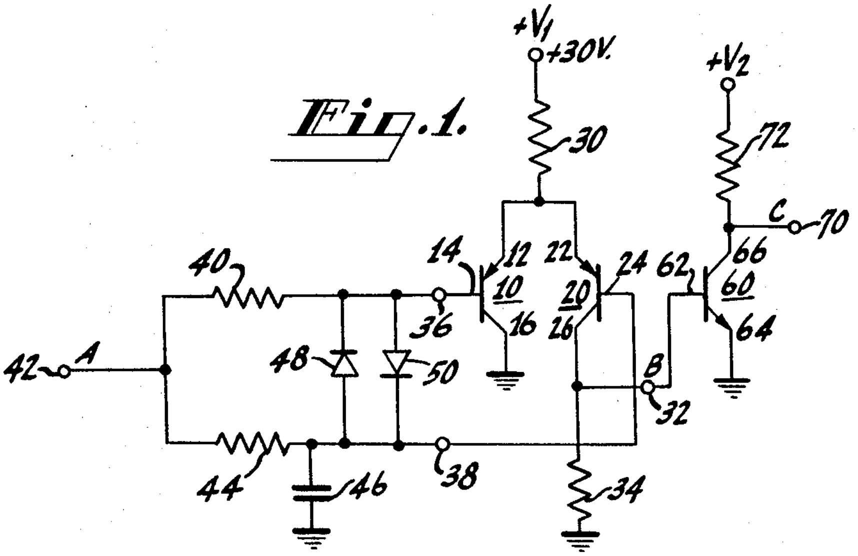
FIG. 1 is a circuit diagram of the preferred form of the invention.

The differential amplifier of the circuit of FIG. 1 includes a matched pair of PNP transistors 10 and 20. The emitters 12 and 22 of these transistors are connected through a common resistor 30 to a positive source of potential $+V_1$. The collector 16 of transistor 10 is connected directly to a source of reference potential, such as ground, and collector 26 of the other transistor is connected through resistor 34 to ground.

The input terminal 42 to which the input signal is applied is connected via resistor 40 to the input terminal 36 at the base 14 of the differential amplifier. It is also connected through a low-pass filter consisting of resistor 44 and capacitor 46 to the second input terminal 38 at the base 24 of the differential amplifier. A pair of diodes 48 and 50 connected, in parallel, anode-to-cathode, is connected between input terminals 36 and 38 for limiting voltage excursions between the bases 14 and 24. Their purpose is to prevent damage to transistor 10.

The output terminal 32 of the differential amplifier is connected to the base 62 of NPN transistor 60. The emitter 64 of this transistor is connected to ground and its collector 66 is connected through resistor 72 to a source of positive potential $+V_2$.

The operation of the circuit of FIG. 1 will be described with reference also to the voltage waveforms of FIG. 2. A signal source (not shown) may apply a waveform such as shown in FIG. 2A to terminal 42. Such a waveform may consist of alternating voltage pulses having positive and negative excursions about some average or direct voltage level which, as illustrated, may be other than zero. The average voltage level may also vary in aperiodic or periodic fashion but with a period much longer than the pulse shown.

With a quiescent input (i.e., no pulses present) transistors 10 and 20 are conducting essentially equal magnitudes of current in linear operation, and transistor 60 is also conducting. Capacitor 46 is charged to a value equal to the average voltage level of the waveform A. Thus, input terminals 36 and 38 are at the same voltage level and B, the output voltage is at some constant positive level, such as approximately +1 volt.

When the leading edge of the pulse shown in FIG. 2A appears at terminal 42, it also appears, without delay, at base 14 of transistor 10. The resistor-capacitor filter 44, 46 has a time constant which is very long relative to the pulse width (typical values of the resistor and capacitor are given later). Therefore, no change in voltage level appears at terminal 38. When base 14 becomes more positive than the base 24, transistor 20 conducts more heavily and transistor 10 less heavily until transistor 10 cuts off and transistor 20 conducts all of the current produced by source $V_1$.

When transistor 20 conducts more heavily, the voltage at terminal 32 tends to increase i.e., tends to become more positive. However, the base-to-emitter diode 62, 64 of transistor 60 acts to clamp terminal 32 at approximately the +1 volt level and acts as a current path for the increased current through transistor 20. Since transistor 60 initially was conducting sufficiently heavily that terminal 70 was essentially at ground potential, increased current through the base emitter of transistor 60 has substantially no effect on the output voltage. Terminal 70, in other words, does not appreciably change its value when transistor 10 is driven to cut off and transistor 20 is rendered more conductive.

Figure 2:
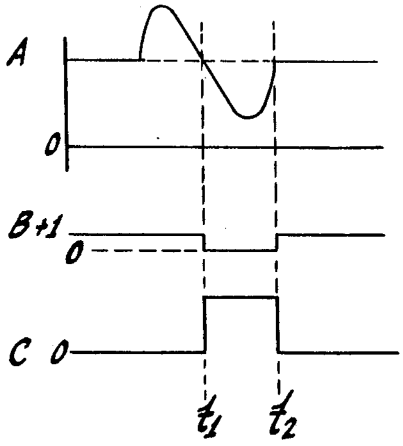
FIG. 2 shows voltage waveforms appearing at designated points in the circuit of FIG. 1.

After the pulse has passed its peak and immediately after time $t_1$, FIG. 2 when it has returned to its average value, base 14 becomes negative relative to base 24 and thus transistor 10 becomes forward biased to a greater extent than transistor 20. It begins to conduct more heavily and transistor 20 conducts less heavily. This action is cumulative and rapid, transistor 20 being driven to cutoff and transistor 10 conducting all of the current provided by source $+V_1$. The driving of transistor 20 to cutoff is manifested at output terminal 32 as a change in voltage level from a slightly positive voltage, such as +1 volt, to ground, as shown at B in FIG. 2.

The leading edge of the resultant output pulse at terminal 70, illustrated at C, time $t_1$ in FIG. 2, marks the point in time that the input wave crosses its average value, in the negative direction.

When the input wave A returns to its average value at time $t_2$of FIG. 2, bases 14 and 24 are once again at the same voltage level, transistor 20 becomes conductive to the same extent as transistor 10, and the collector 26 voltage level again increases to its quiescent value of about +1 volt. This causes transistor 60 to turn on as shown at C, time $t_2$, in FIG. 2. The output voltage level at 70, in other words, returns to its quiescent level essentially ground. It is thus seen that an output pulse is generated at terminal 32 whose leading edge occurs at the time that the input wave passes through its average value. This average value is stored as a voltage level on filter capacitor 46.

As previously stated, the average value of waveform A may vary or drift with time due, for example, to different signal source circuits being coupled to terminal 42 or to direct voltage drifts in the signal source circuit. The filter components are designed to have a time constant which is short relative to the period of the average value voltage. This means that the voltage present at terminal 38 is always equal to this average value so that the circuit of the present invention always accurately senses the time of passage of the input wave through its average value. In one embodiment of the circuit shown which is designed to detect negative-going crossovers of the average value, the component values were as follows:

Resistors 40, 44 10K ohms
Resistor 30 7.5K ohms
Resistor 34 1.3K ohms
Capacitor 46 40 μf
Transistors 10, 20 2N2802 (Matched Pair)

A circuit to detect positive crossovers may be made by substituting transistors 10, 20 and 60 opposite in polarity to those shown and by reversing the voltage polarity of $V_1$ and $V_2$.

The circuit of the present application should not be confused with other differential amplifier circuits used in totally different applications. For example, the circuit of Jenkins' U.S. Pat. No. 3,073,972, which bears a striking resemblance to the circuit of the present invention, relates to a different problem than dealt with here and differs from the present circuit in an important and fundamental respect. Jenkins relates to the problem of producing an output pulse whose leading edge is delayed relative to an input pulse. In Jenkins, an input signal is applied directly to one input terminal to a differential amplifier and through a delay line to the other input terminal to the amplifier. The delay line applies the same signal it receives to the input terminal to the amplifier, but delayed in time. In the present circuit, a filter, not a delay line is employed. The filter does not apply the same signal it receives to the amplifier but instead clamps one input terminal of the amplifier to the average direct voltage level of the signal source, changing only if that average value changes. The result is a completely different circuit from that of the Jenkins patent, one which is a crossover detector having the advantages over the prior art already discussed.

What is claimed is:

1. In combination:

a differential amplifier having first and second input terminals and an output terminal;

a bidirectionally conducting impedance;

a filter of the type which, in response to an alternating input signal produces an output direct voltage level having the average value of said input signal; and means for applying said alternating signal through said bidirectionally conducting impedance to said first input terminal and through said filter to said second input terminal.

2. The combination as claimed in claim 1, further including a first source of reference potential and wherein said filter means comprises a resistor and capacitor, said resistor coupled between said means for applying said alternating signal and said second input terminal and said capacitor coupled between said second input terminal and said reference potential, the time constant of said resistor and capacitor being substantially longer than the period of said alternating signal.

3. The combination as claimed in claim 2, further including a second source of reference potential wherein said differential amplifier comprises first and second bipolar transistors, each having emitter, base and collector terminals, said first and second transistor emitters being coupled together and resistively coupled to said second source of reference potential, said first transistor collector being coupled directly to said first source of reference potential and said second transistor collector being coupled to said output terminal and coupled resistively to said first source of reference potential, and said first and second transistor bases being coupled respectively to said first and second input terminals.

4. The combination as claimed in claim 2, further including a pair of diodes connected in parallel anode-to-cathode coupled between said first input terminal and said second input terminal to limit voltage excursions therebetween.

5. In combination:

a source producing a signal which varies in a positive and negative sense from a reference direct voltage level which itself varies in amplitude;

a differential amplifier having first and second input terminals and an output terminal;

a filter of the type which in response to said signal produces an output direct voltage level having a value equal to the average level of said voltage; and means for applying the signal from said source including all of the positive and negative variations thereof directly to said first input terminal and for applying said signal through said filter to said second input terminal.

6. The combination as claimed in claim 5, wherein said filter means comprises a resistor and a capacitor arranged in integrator configuration and having a time constant at least ten times the period of said positive and negative signal and no greater than one-tenth the period of said amplitude varying direct voltage level.

7. The combination as claimed in claim 6, further including means coupled to said output terminal for producing a signal in response to the passage of said signal source waveshape through its average value in only one of two possible directions.